United States Patent
Labonte et al.

(10) Patent No.: US 11,303,105 B2
(45) Date of Patent: Apr. 12, 2022

(54) INSULATING BOX AND METHOD FOR ELECTRICAL OUTLETS, SWITCHES AND LIGHT FIXTURES

(71) Applicant: IZO BOX INC., Prevost (CA)

(72) Inventors: Daniel Labonte, Prevost (CA); Simon Prud'Homme, Lac-des-Ecorces (CA)

(73) Assignee: IZO BOX, INC., Prevost (CA)

( * ) Notice: Subject to any disclaimer, the term of this patent is extended or adjusted under 35 U.S.C. 154(b) by 305 days.

(21) Appl. No.: 16/276,839

(22) Filed: Feb. 15, 2019

(65) Prior Publication Data

US 2019/0267784 A1   Aug. 29, 2019

Related U.S. Application Data

(60) Provisional application No. 62/635,605, filed on Feb. 27, 2018.

(51) Int. Cl.
*H02G 3/08* (2006.01)
*H02G 3/12* (2006.01)
*H02G 3/18* (2006.01)

(52) U.S. Cl.
CPC ............ *H02G 3/088* (2013.01); *H02G 3/081* (2013.01); *H02G 3/083* (2013.01); *H02G 3/12* (2013.01); *H02G 3/123* (2013.01); *H02G 3/18* (2013.01)

(58) Field of Classification Search
None
See application file for complete search history.

(56) References Cited

U.S. PATENT DOCUMENTS

| | | | | | |
|---|---|---|---|---|---|
| 1,713,101 | A | * | 5/1929 | Starrett | H02G 3/14 174/66 |
| 2,155,627 | A | * | 4/1939 | Welch | H02G 3/123 220/3.6 |
| 2,378,861 | A | * | 6/1945 | Peevey | H02G 3/121 220/8 |
| 2,590,391 | A | * | 3/1952 | Elmore | H02G 3/123 220/3.6 |
| 2,675,140 | A | * | 4/1954 | Pommerening | H02G 3/123 220/3.6 |

(Continued)

FOREIGN PATENT DOCUMENTS

CA        2129202 A1 *  1/1996 ............. H02G 3/126

*Primary Examiner* — Binh B Tran
*Assistant Examiner* — Muhammed Azam
(74) *Attorney, Agent, or Firm* — Brouillette Legal Inc.; Robert Brouillette

(57) ABSTRACT

A method of insulating an electrical switch/outlet/fixture box installed in an exterior wall comprising a plurality of vertically extending studs, a first insulating material disposed between the plurality of vertically extending studs, a water vapor barrier extending over the first insulating material, furring extending horizontally over the first insulating material and a finishing panel attached to the furring, using an insulated box, the method comprising the steps of making an opening in the water vapor barrier adjacent to one of the plurality of vertically extending studs; introducing the insulated box into the vapor barrier opening; introducing the electrical switch/outlet/fixture box into the insulated box; and attaching the electrical switch/outlet/fixture box and the insulated box to the one of the plurality of vertically extending studs.

10 Claims, 2 Drawing Sheets

(56) References Cited

U.S. PATENT DOCUMENTS

| | | | | |
|---|---|---|---|---|
| 3,377,756 A * | 4/1968 | Polhamus | H02G 3/105 | 52/220.7 |
| 3,891,113 A * | 6/1975 | Salg | H02G 3/123 | 220/3.6 |
| 3,995,102 A * | 11/1976 | Kohaut | A62C 3/16 | 174/483 |
| 4,189,619 A * | 2/1980 | Pedlow | C09D 5/185 | 106/18.11 |
| 4,273,821 A * | 6/1981 | Pedlow | C09D 5/185 | 106/18.11 |
| 4,296,870 A * | 10/1981 | Balkwill | H02G 3/126 | 174/57 |
| 4,607,469 A * | 8/1986 | Harrison | F16L 5/02 | 138/89 |
| 4,800,696 A * | 1/1989 | Miller | E04F 17/08 | 174/495 |
| 5,116,413 A * | 5/1992 | Nooren | H02G 3/22 | 106/215.5 |
| 5,531,345 A * | 7/1996 | Nakamura | H02G 3/088 | 220/3.8 |
| 5,728,971 A * | 3/1998 | Nash | H02G 3/0691 | 174/50.52 |
| 5,922,990 A * | 7/1999 | Alaerts | H02G 3/088 | 174/652 |
| 6,095,252 A * | 8/2000 | Draugelates | H02G 3/0412 | 169/58 |
| 6,239,365 B1 * | 5/2001 | McEvers | H02G 3/088 | 174/50 |
| 6,290,236 B1 * | 9/2001 | Hagmann | H02G 3/088 | 16/2.1 |
| 6,437,241 B1 * | 8/2002 | Neujahr | H02G 3/088 | 174/58 |
| 6,642,445 B1 * | 11/2003 | Lalancette | H02G 1/00 | 174/135 |
| 6,894,223 B1 * | 5/2005 | Shotey | H02G 3/14 | 174/50 |
| 6,951,983 B1 * | 10/2005 | Gretz | H02G 3/121 | 174/58 |
| 7,067,736 B1 * | 6/2006 | Lemke | H02G 3/14 | 174/50 |
| 7,235,739 B2 * | 6/2007 | King, Jr. | H02G 3/086 | 174/480 |
| 7,433,178 B2 * | 10/2008 | Bang | H05K 7/20963 | 174/66 |
| 7,557,296 B2 * | 7/2009 | Lemke | H02G 3/14 | 174/50 |
| 7,645,946 B2 * | 1/2010 | Smith | H02G 3/22 | 174/650 |
| 8,222,522 B1 * | 7/2012 | Easthouse | H02G 3/14 | 174/66 |
| 8,686,287 B1 * | 4/2014 | Gretz | H02G 3/123 | 174/58 |
| 10,205,310 B1 * | 2/2019 | Gretz | H02G 3/088 | |
| 2002/0112873 A1 * | 8/2002 | Shotey | H02G 3/18 | 174/67 |
| 2004/0123996 A1 * | 7/2004 | Lalancette | H02G 3/12 | 174/50 |
| 2005/0067546 A1 * | 3/2005 | Dinh | H02G 3/125 | 248/343 |
| 2006/0207781 A1 * | 9/2006 | Denier | H02G 3/123 | 174/53 |
| 2006/0278422 A1 * | 12/2006 | Drane | H02G 3/185 | 174/66 |
| 2010/0018769 A1 * | 1/2010 | Massey | H02G 3/00 | 174/77 R |
| 2010/0050538 A1 * | 3/2010 | Struthers | H02G 3/123 | 52/27 |
| 2010/0067176 A1 * | 3/2010 | Garavuso | H02G 3/123 | 361/679.01 |
| 2010/0077681 A1 * | 4/2010 | McCleskey | H02G 3/088 | 52/220.1 |
| 2011/0258944 A1 * | 10/2011 | Radoane | E04B 1/665 | 52/62 |
| 2012/0279746 A1 * | 11/2012 | Gagne | H02G 3/123 | 174/50.51 |
| 2013/0032372 A1 * | 2/2013 | Charbonneau | H02G 3/16 | 174/59 |
| 2013/0180774 A1 * | 7/2013 | Gagne | H02G 3/12 | 174/480 |
| 2014/0374412 A1 * | 12/2014 | Rumsey | H02G 3/08 | 220/3.8 |
| 2016/0141852 A1 * | 5/2016 | Gagne | H02G 3/083 | 174/54 |
| 2016/0204588 A1 * | 7/2016 | Trojanowski | H02G 3/14 | 174/66 |
| 2016/0226232 A1 * | 8/2016 | Gagne | H02G 3/14 | |
| 2016/0241007 A1 * | 8/2016 | Tremaine | H01R 9/2416 | |
| 2017/0256927 A1 * | 9/2017 | Padilla | G06K 7/10336 | |
| 2018/0123332 A1 * | 5/2018 | Laukhuf | H02G 3/123 | |
| 2019/0140435 A1 * | 5/2019 | Hannum | H02G 3/14 | |
| 2019/0267784 A1 * | 8/2019 | Labonte | H02G 3/081 | |

* cited by examiner

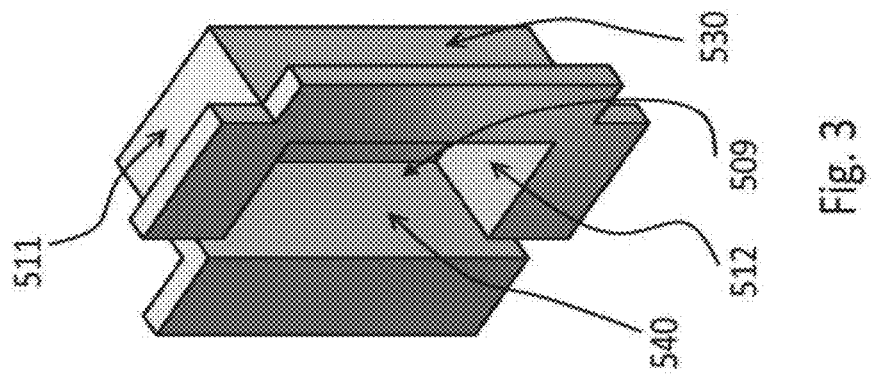
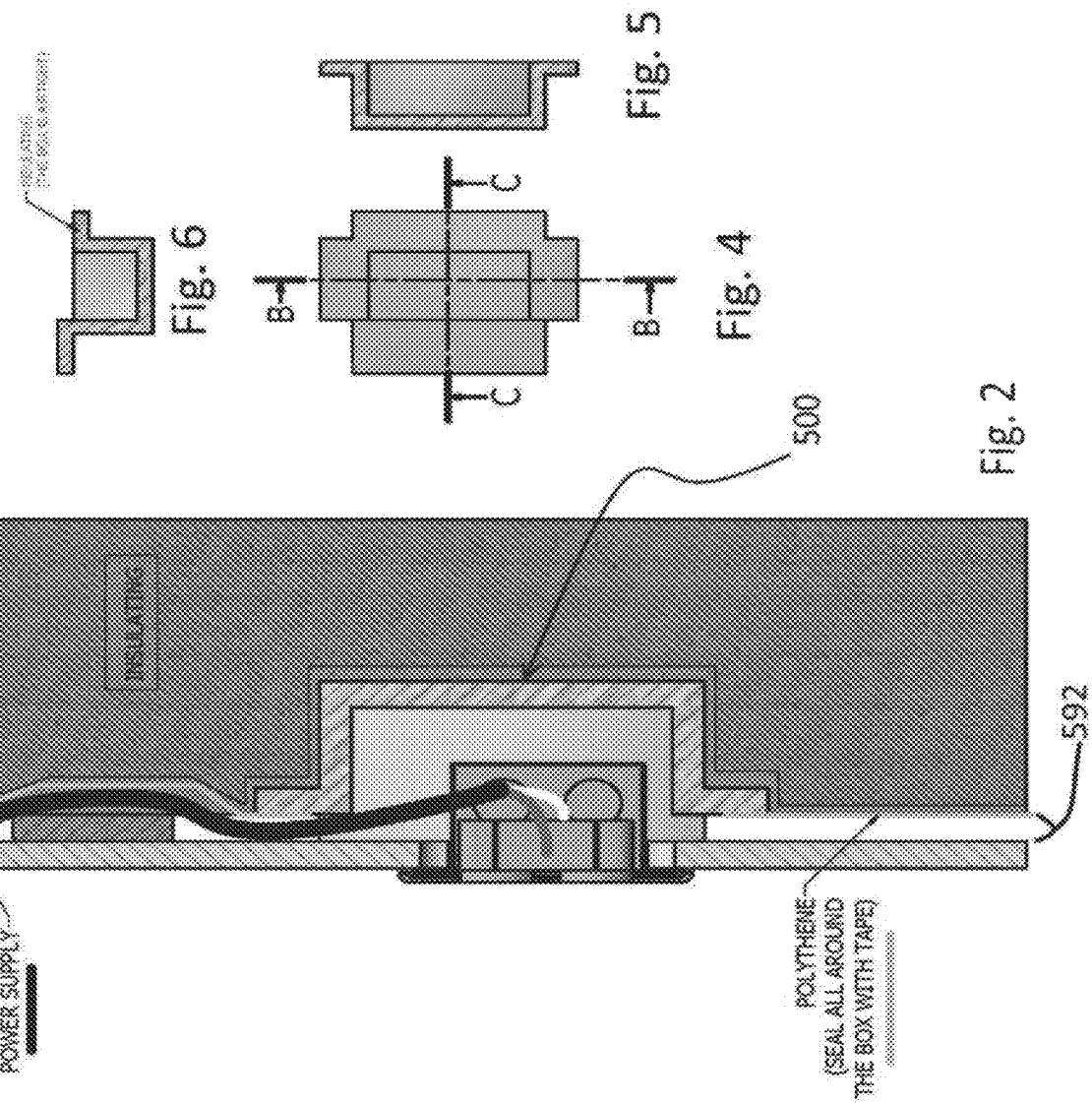

INSULATING BOX AND METHOD FOR ELECTRICAL OUTLETS, SWITCHES AND LIGHT FIXTURES

CROSS-REFERENCE TO RELATED APPLICATIONS

The present patent application claims the benefits of priority of U.S. Provisional Patent Application No. 62/635,605, filed on Feb. 27, 2018, at the United States Patent and Trademark Office and entitled: "Insulating box for electrical outlets and recessed light fixtures", the content of which is incorporated herein by reference.

FIELD OF THE INVENTION

The present invention generally relates to inhibition of air and heat flow between two sides of a wall or ceiling in a house or other building by using an insulating box comprising a vapour barrier.

BACKGROUND OF THE INVENTION

When an electrical outlet/switch box or a light fixture is installed on an exterior wall or ceiling especially in a heated house or building, it is difficult to prevent leakage of significant amounts of air and heat which reduces the insulating efficiency of the wall. To limit such reduced efficiency, it is necessary to minimise and preferably totally prevent air and heat from interior of the building to migrate outwardly or vice versa.

A solution to this problem has been proposed by Rye Glen and Caple Donald in the Canadian patent 2,057,267 by using a resilient sealing membrane tightly fitted to the inside or the exterior of the electrical outlet box. Such design requires the electrical wires to pass through the membrane and therefore creates a route for the air and heat to migrate therethrough.

It is also known in the art that a membrane impervious to air flow, such as a polyethylene membrane may used to surround the electrical box to reduce the loss of heat. Again, such membranes require that an aperture be made therethrough to allow the power wires to pass through it therefore creating a route for the air and heat to migrate therethrough.

Generally, the electrical box is made of metal that enhances the heat transfer between the inside of the building and the outside. A similar problem exists with respect to the metal boxes traditionally used when installing light fixtures, whether recessed or not.

Hence, there is a need for a novel insulating box for electrical boxes and a method of installing the electrical wires in a wall or ceiling to avoid perforating the polythene vapor barrier.

SUMMARY OF THE INVENTION

The aforesaid and other objectives of the present invention are realized by generally providing an insulating box which is configured to allow the passage of electrical wires without any aperture through the walls of the insulating box to significantly reduce and preferably prevent air flow leakage and heat loss.

In another aspect of the invention, a method is provided to facilitate the installation of the electrical boxes and/or light fixtures in walls and ceilings. During the installation there is no need to pierce the polythene vapor barrier to allow for the passage of electrical wires.

Contrary to the prior art, in the present invention the electrical box does not have any aperture or weakened area which are susceptible to allow heat and/or air flow leakage.

The insulation box is available in different sizes to allow several electrical box configurations during the installation in the wall or ceiling.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 2 is a longitudinal section view of the wall shown in FIG. 1.

FIG. 3 is a top perspective view of a first embodiment of an insulating box in accordance with the invention.

FIG. 4 is a front view of the insulating box shown in FIG. 3.

FIG. 5 is the C-C section view of the insulating box shown in FIG. 4.

FIG. 6 is the B-B section view of the insulating box shown in FIG. 4.

DETAILED DESCRIPTION OF A PREFERRED EMBODIMENT

Figure 1:
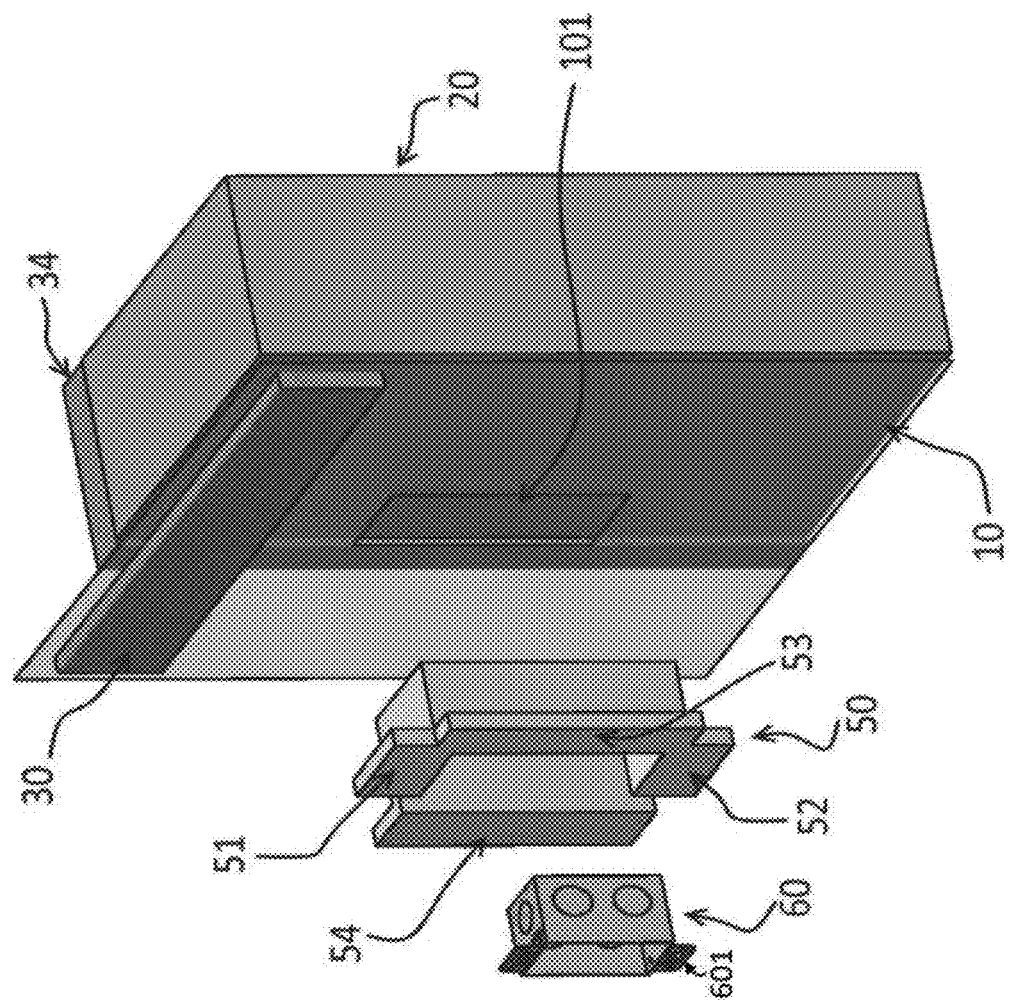
FIG. 1 is a perspective exploded view of an electrical outlet box installation in an exterior wall.

A novel insulating box will be described hereinafter. Although the invention is described in terms of specific illustrative embodiments, it is to be understood that the embodiments described herein are by way of example only and that the scope of the invention is not intended to be limited thereby.

The exterior wall as shown in FIG. 1 comprises a plurality upwardly extending studs 34 such as a 2"×6". Insulation 20 is placed between the studs 34 and a vapour barrier 10, for example a polyethylene membrane is placed over the insulation 20 and the studs 34. A series of a horizontal furring 30 preferably of 1"×4" are attached to the studs 34 and hold the vapour barrier 10 in place. The finishing panel 40 such as a drywall made of gypsum or other known material is subsequently attached to the furring 30 as is known in the art.

Now referring to FIGS. 1 to 6, a preferred embodiment of the insulating box 50 is illustrated. The front portion of the box 50 comprises an opening. It comprises a bottom wall 500, and side walls 511, 512, 530 and 540 upstanding therefrom. The front comprises outwardly extending flanges 51, 52, 53 and 54. The inside of the box 50 is sized such that it will receive the electrical outlet/switch/fixture box 60.

The flanges 51, 52, 53 and 54 are substantially perpendicular to the side walls 511, 512, 530 and 540.

The top flanges 51, 52, 53 attached respectively to the top of the side walls 511, 512 and 530 are preferably equally spaced from the bottom wall 500 to form a front opening 509 in the box 50.

In a preferred embodiment the top flange 54 attached to the side wall 540 is spaced from the bottom wall 500 of a distance which is greater than a distance corresponding to the distance from the bottom wall 500 to the front opening 509. The difference in the distances should not be greater than the thickness of the furring 30 and preferably is identical thereto.

In a preferred embodiment the difference in distances is greater than the diameter of conventional electrical cable 80.

An opening 101 is made in the vapour barrier 10 to allow the insulating box 50 to be inserted therein preferably adjacent to one of the studs 34. Preferably, the opening 101 is slightly smaller than the outside perimeter of the box 50 to insure a thigh fit.

After the insulating box 50 is inserted into the aperture 101, a tape, preferably made of a water vapour material is preferably placed such that it overlaps each of the flanges 51, 52, 53 and the vapour barrier 10 and creates a seal preventing air from crossing into the wall. A similar tape seal may also be made between the flange 54 and the vapour barrier 10.

In a preferred embodiment the width of the flange 54 is greater than the width of flanges 51, 52 and 53.

In another embodiment, a double-sided tape or hook and loop means such as Velcro™ is placed on the underside of flanges 51, 52, 53 and preferably flange 54 such as to create a seal preventing air from crossing into the wall.

In a preferred embodiment the side walls 511, 512, 530, 540 and the bottom wall 500 are made of an insulating material preferably covered by a vapour barrier such as polyethylene or aluminium.

In use, as shown in FIG. 2, one or more electrical cables 80 are brought into proximity to the insulating box 50 by introducing them behind the furring 30 but on top of the vapour barrier 10. The cable 80 is then introduced into the electrical box 60 through one of the openings 601 and held in place therein as is well known in the art.

The electrical box 60, with the wire 80 attached thereto, is then introduced into the opening 509 while making sure that the wire 80 passes over one or more of the flanges 51, 52, 53 but not over flange 54 such that it will end up in the gap 592 corresponding to the thickness of the furring 30. The electrical box 60 is then attached with screws or nails (not shown) which extent through the wall 540 to the stud 34 as is well known in the art.

An aperture 401 is made in the drywall of the drywall 40 to provide access to the electrical box 60 to connect an outlet 64, light switch, fixture or the like. A cover plate 68 is then attached by conventional attachment means to the electrical box 60 or the outlet 64.

If the insulating box is used to insulate a recessed electrical fixture, the side walls will need to be dimensioned such that the applicable electrical code requirements will be met. If heat is generated in the insulating box, the inside thereof should be covered with an aluminium foil or other acceptable heat refracting material.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method of insulating an electrical switch/outlet/fixture box installed in an exterior wall comprising a plurality of vertically extending studs, a first insulating material disposed between the plurality of vertically extending studs, a water vapor barrier extending over the first insulating material, furring extending horizontally over the first insulating material and a finishing panel attached to the furring, using an insulated box comprising a bottom wall made of a second insulating material, a plurality of side walls made of the second insulating material attached together and to the bottom wall and defining a top opening adapted to receive the electrical switch/outlet/fixture box comprising the following steps:
   a) making an opening in the water vapor barrier adjacent to one of the plurality of vertically extending studs;
   b) introducing the insulated box into the vapor barrier opening;
   c) introducing the electrical switch/outlet/fixture box into the insulated box;
   d) attaching the electrical switch/outlet/fixture box and the insulated box to the one of the plurality of vertically extending studs.

2. The method of claim 1, further comprising the step of sealing sides of the insulated box to the vapor barrier.

3. The method of claim 2), wherein the sealing is carried out with use of a tape.

4. The method of claim 2), wherein the sealing is carried out with use of hook and loop means.

5. The method of claim 2), wherein one of the plurality of side walls extends above the others of the plurality of side walls.

6. The method of claim 2), wherein the insulated box further comprises a plurality of flanges attached to the top of the plurality of side walls, the plurality of flanges extending outwardly generally perpendicularly from the top opening of the insulated box.

7. The method of claim 5), wherein the insulated box further comprises a plurality of flanges attached to the top of the plurality of side walls, the plurality of flanges extending outwardly generally perpendicularly from the top opening of the insulated box.

8. The method of claim 7), wherein the flange attached to the side wall extending above the others of the plurality of side walls has a thickness which is equal or greater than a diameter of an electrical cable destined to be inserted into the electrical switch/outlet/fixture box.

9. The method of claim 8), wherein the flange attached to the side wall extending above the others of the plurality of side walls is placed on top of the one of the one of the plurality of vertically extending studs while tops of the others of the plurality of flanges are disposed in a same plane as a plane of the water vapor barrier.

10. The method of claim 1, the first insulating material being the same as the second insulating material.

* * * * *